L. P. JOSSE.
Grain Separator.
No. 40,756.
2 Sheets—Sheet 1.
Patented Dec. 1, 1863.
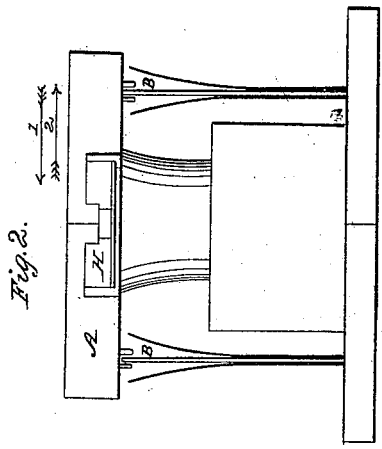
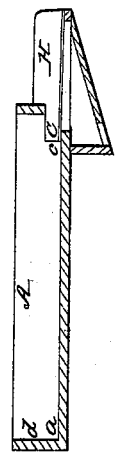
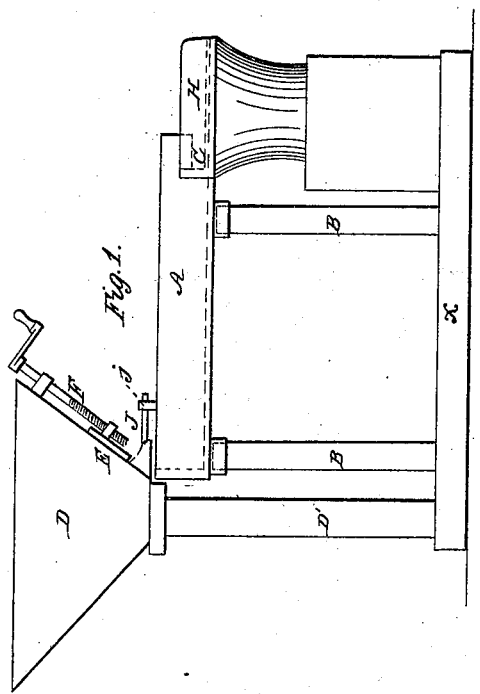
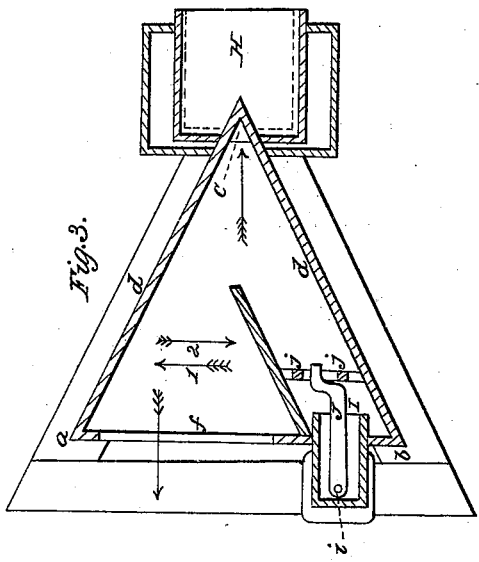
Witnesses:
Ch. D. Patten
P. E. Wilson
Inventor:
Louis Pierre Josse,
By atty A.B. Stoughton

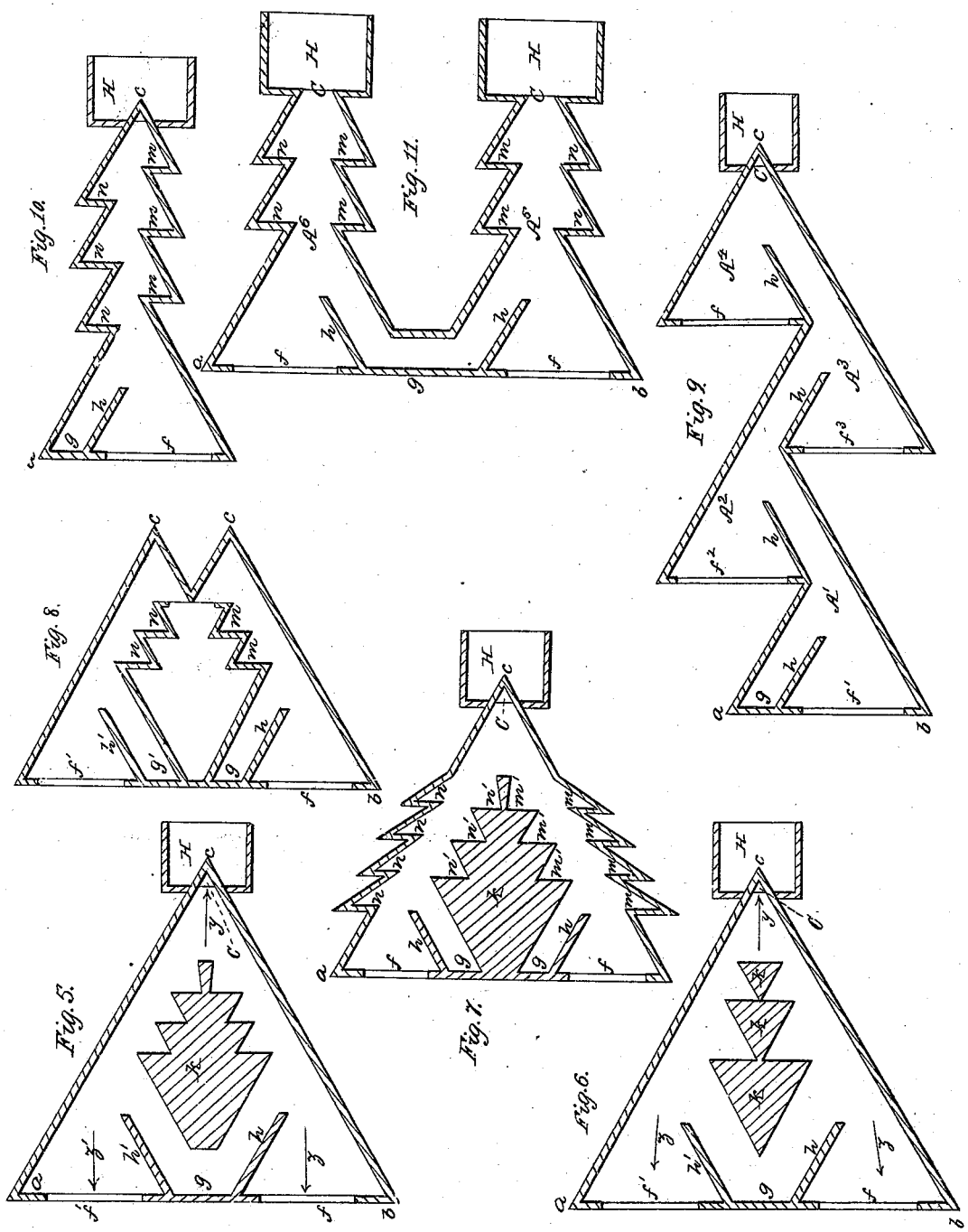
L. P. JOSSE.
Grain Separator.
No. 40,756.
2 Sheets—Sheet 2.
Patented Dec. 1, 1863.
Witnesses:
Jno. D. Patton
P. E. Wilson
Inventor:
Louis Pierre Josse
By Atty A. B. Stoughton

UNITED STATES PATENT OFFICE.

LOUIS PIERRE JOSSE, OF PARIS, FRANCE.

IMPROVEMENT IN GRAIN-SEPARATORS.

Specification forming part of Letters Patent No. 40,756, dated December 1, 1863.

*To all whom it may concern:*

Be it known that I, LOUIS PIERRE JOSSE, of Paris, in the Empire of France, have invented a new and Improved Apparatus for Cleansing or Separating Grain or Seeds; and I do hereby declare that the following is a full and exact description thereof, reference being had to the accompanying drawings, and to the letters of reference marked thereon.

The invention relates to an improved apparatus for separating or cleansing wheat, rye, barley, oats, or other grain or seeds, and separate therefrom the chaff or lighter particles and the dust or other impurities, and, if required, sorting or separating the grain or seeds in several qualities, according to their specific gravity.

The apparatus consists of a shallow box, by preference of an equilateral triangular shape, the bottom of which is provided all around with a narrow rim, and is mounted either horizontally or in a slightly-inclined position on three or more feet of thin wood, sheet metal, or other suitable material of sufficient flexibility for allowing of imparting to the box a more or less rapid horizontal to-and-fro or reciprocating motion in a direction parallel to that side of the box situated opposite the corner by which the grain or seeds take their exit from the apparatus, by the effect of which motion the grain or seeds, which, from a hopper fall into the box, will be continually thrown back from one to the other of the two remainder sides of the box, and thereby cause the chaff or lighter particles to rise to the top of the grain or seeds and travel toward the first-mentioned side of the box—viz., that situated nearest to the hopper—whereas the grain, seeds, or other heavier parts will advance toward the corner situated opposite this side—viz., the corner pointing downward, in case a slightly-inclined position be given to the box—and by an aperture provided in this corner fall on proper screens, perforated plates, or sieves, for depriving the grain or seeds of the remainder of the extraneous matters contained therein. The chaff or other lighter particles contained in the grain or seeds rise on the top of these latter, and, traveling in an opposite direction to them, finally fall over a depression provided for this purpose in the rim of that side of the box situated nearest to the hopper. In the inside of the box one or more partitions, of an angular shape, are fixed to the bottom of the box for the purpose of conducting the grain toward the exit-opening and operating the separation of the chaff or lighter particles therefrom, while two or more of the said boxes may be connected together lengthwise or in any other suitable manner, so as to operate simultaneously. The sides of the box may also be provided with angular indentations for aiding in the separation of the lighter from the heavier parts of the grain or seeds.

I now will enter more fully into the details of the invention, and refer thereby to the annexed drawings, in which—

Figure 1 represents a side, Fig. 2 a front elevation, and Fig. 3 a top view, of the apparatus, while Fig. 4 represents a separate side view of the triangular drawer-shaped box and screens connected thereto. The remainder of the figures represents plan views of various modifications of the said box.

In all these figures the same letters of reference show corresponding parts.

The apparatus consists, as has been already said above, of a shallow box or boxes, A A' A², by preference of a triangular shape, $a\ b\ c$, Fig. 3, but which shape may be modified according to the effects to be obtained, or the nature of the grain or the seeds to be cleansed or separated. The bottom $a\ b\ c$ is provided around its three sides with a narrow rim, $d$, so as to make the box assume the form of a drawer, mounted either horizontally or in a slightly-inclined position on three or more feet or standards, B, in which latter case the corner $c$ requires to be situated a little below the corners $a$ and $b$. The lower end of the feet B is fixed either to the floor or to a frame, X, resting on this latter. The feet or uprights B should be made of strong sheet metal, wood, or any other suitable material offering sufficient elasticity for allowing the operator to impart to the box or boxes A A' A² a more or less quick horizontal to and-fro motion in the direction of the arrows 1 and 2, Figs. 2 and 3, so as to cause the grain or seeds to be projected to and fro from one to the other of the sides of the box and of the partitions or angular prisms provided in this latter, which motion causes the chaff or lighter particles to rise on the top of the grain or seeds and travel toward an opening, $f$, in the side $a\ b$, and take their exit by this opening, whereas the grain, seeds, or heavier parts advance toward the corner $c$, and, through an opening, C, provided in the bottom $a\ b\ c$ of the box in that part, fall on one or more screens, sieves, or perforated plates H.

The wheat or other grain or seeds to be cleansed or separated are thrown in a hopper, D, fixed by a standard, D', to the frame X or to the floor.

The delivery of the grain into the box A is regulated by a sliding door, E, worked by a screw, F', or by any other suitable means, and, if required, the grain may fall on a small screen, provided in the box A, underneath the exit opening of the hopper, for separating from the grain or seeds small bits of straw or other similar impurities mixed therewith, while by the horizontal to-and-fro motion imparted to the box A the grain is caused to advance toward the corner $c$, as has been already mentioned above, and having become cleansed of the lighter parts or the chaff falls on the screens H, the form and size of the perforations, meshes, or openings of which latter depends on the work to be performed, for which purposes these screens, sieves, or strainers H are movable and rest in a small frame fixed to the box A, so as to allow of changing the said screen when required. As has been mentioned above, the chaff or lighter particles will ascend toward and fall over an opening, $f$, provided in the rim of the side $a\ b$ of the box, where they fall into a proper receiver. This traveling or advancing of the heavy grain or seeds in one, and of the chaff or lighter parts in an opposite, direction forms one of the conspicuous parts of my invention.

I must observe here that instead of having but a small screen underneath the exit-opening of the hopper the entire bottom of the box A might be provided with small perforations or openings for the dust to fall through, but so as not to interfere with the traveling of the grain or of the chaff.

The box A may be made of wood, sheet-iron, or any other suitable material or metal, and its size may vary according to the work to be performed, while the above-mentioned horizontal reciprocating motion may be imparted to the box A, either by hand or by any suitable prime mover and connecting machinery. At all events the intensity of this motion must be such as to cause the grain or seeds to be projected from one to the other of the sides $a\ c$ and $b\ c$ of the box, or of these sides to those of the prisms or partition plate or plates $h$ inserted in this box, the quickness of the motion being regulated so as to obtain the due separation of the lighter parts or the chaff from the heavier parts of the grain or seeds to be cleansed or separated.

In order to prevent the choking up of the exit-opening I of the hopper, an agitator or shaker, J, turning on a pin, $i$, is moved to and fro by the effect of the stops $j$. I further wish to observe here that the motion to be imparted to the apparatus, instead of being continuous, may be intermittent or varied according as requisite for obtaining the due separation of the lighter from the heavier parts of the grain or seeds.

The Figures 5, 6, 7, 8, 9, 10, and 11 show various modifications of the arrangement of the box A.

In Fig. 5 the grain or seeds enter the box at $g$ and are conducted toward the rims $a\ c$ and $b\ c$ by means of the partitions $h$ and $h'$ and the indented prism or obstacle K, which partitions and obstacles are fixed to the bottom in the interior of the box A and are of the same height as the rim of this latter.

The exit of the grain or seeds is shown by the arrow $y$, while the chaff or lighter parts follow the arrows $z\ z'$ and leave the box by the openings $f$ and $f'$.

Fig. 6 shows another form of obstacle, K.

In Figs. 7, 8, 9, and 10 the sides $a\ c$ and $b\ c$ of the box are provided with angular indentations $m$ and $n$, the said indentations corresponding together in the Figs. 7 and 8, while in the Figs. 9 and 10 the angle of each indentation on the side $a\ c$ of the box is situated opposite the sides of this angle in the corresponding indentation of the opposite side, $b\ c$, of the box.

In Fig. 9 the box A is divided in a series of smaller boxes, $A'\ A^2\ A^3$. By this means the greater part of the chaff or lighter particles mixed with the grain or seeds in the first box, $A'$, takes its exit at $f'$, while the grain enters the second box, $A^2$. The lighter particles or the lighter grain or seeds in this box $A^2$ are in their turn separated from the heavier ones and take their exit at $f^2$, while the heavier grain or seeds enter into the box $A^3$, where again the separation between the lighter and the heavier parts takes place. It will be obvious, consequently, that by this apparatus not only the cleansing, but also a sorting of the grain or a separating, according to the difference in specific gravity, will take place.

In Fig. 11 two boxes, $A^5$ and $A^6$, are connected together in one apparatus.

From what has been explained above, it will be evident that a great many more modifications may be made in the shape or arrangement of the box or boxes in which the separation of the lighter parts of the grain or seeds or the chaff from the heavier parts takes place, as also in that of the screens, sieves, or perforated plates, the hopper, or in the general arrangement of the apparatus, without departing from the main feature of the invention, which consists in operating the separation of the lighter from the heavier parts by imparting a suitable horizontal reciprocating motion to the box or boxes A, thereby causing the lighter parts to travel and leave the said box or boxes in an opposite direction to that of the heavier parts with which the same are mixed.

Having thus described and particularly ascertained the nature of the invention and the manner in which the same is or may be put into effect, I declare that what I consider to be novel and original, and therefore claim as my invention, which I desire to secure by Letters Patent, is—

The general arrangement and combination of parts of the above-described apparatus for cleansing or separating wheat or other grain or seeds and separate therefrom the chaff, dust, or other extraneous matters or impurities mixed therewith, in which apparatus the separation of the chaff or lighter parts from the grain or seeds or heavier parts is effectuated by imparting a suitable horizontal reciprocating motion to a triangularly-shaped shallow box or boxes in which fall the grain or seeds to be cleansed, by the effect of which motion, and the configuration of the said box or boxes, the chaff or lighter parts rise to the top of the grain, seeds, or heavier parts, and travel and leave the said box or boxes in an opposite direction to that of these latter parts, substantially as described.

L. P. JOSSE.

Witnesses:
    DREYFUS,
    E. SHERMAN GOULD.